UNITED STATES PATENT OFFICE.

FREDERIC P. DEWEY, OF WASHINGTON, DISTRICT OF COLUMBIA, ASSIGNOR TO DEWEY ORE REDUCTION CORPORATION, OF WASHINGTON, DISTRICT OF COLUMBIA, OF VIRGINIA.

TREATING ARSENID ORES.

954,264.      Specification of Letters Patent.      Patented Apr. 5, 1910.

No Drawing.      Application filed November 1, 1907. Serial No. 400,223.

*To all whom it may concern:*

Be it known that I, FREDERIC P. DEWEY, citizen of the United States, residing at 1801 Summit Place, Washington, District of Columbia, have invented certain new and useful Improvements in Treating Arsenid Ores, of which the following is a specification.

My invention relates to the treatment of metallic arsenid ores and similar compounds in general and especially the cobalt, nickel, silver arsenid ores found in the cobalt region of Canada, and is especially directed to the recovery of arsenic from such ores in the form of soluble alkali arsenate.

The object of my invention is to convert the elemental arsenic (As) of arsenids into arsenic acid ($As_2O_5$) and recover this arsenic acid in the form of a water soluble arsenate, for which purpose I roast or otherwise oxidize the arsenid under the conditions most suitable for the production of the maximum amount of arsenic acid possible from the particular arsenid under treatment and convert the arsenic acid into a water soluble arsenate, which is dissolved in water and separated from the insoluble residue.

To this end the process consists in roasting or otherwise oxidizing the metallic arsenid for the formation of metallic arsenates, which are then decomposed by treatment with caustic alkali with the formation of alkali arsenate and various hydrated or other oxids of the metals originally combined with arsenic in the ore and separating the solution of alkali arsenate from the insoluble residue.

It is well known that in the ordinary roasting of ores containing arsenids some arsenic acid ($As_2O_5$) is formed but heretofore in such roasting every effort has been made to keep the amount of arsenic acid formed at the smallest amount possible and even when once it was formed it was often broken up again by reducing it to the volatile arsenious acid ($As_2O_3$) which was driven off from the roasted ore. Previous to my invention it had never been proposed to utilize this method of forming arsenic acid and no one had roasted arsenid ores for the purpose of forming the maximum amount of arsenic acid ($As_2O_5$). All previous roasting of arsenid ores has been for the purpose of removing the arsenic as completely as possible from the roasted ore in order to facilitate the extraction of the valuable metals the ore contained, while my roasting seeks to oxidize the arsenic beyond the arsenious condition as fully as I can for the definite purpose of retaining the largest quantity obtainable of the arsenic in the roasted ore in the form of arsenic acid ($As_2O_5$). Again in the preparation of certain ores for smelting, after being roasted in the ordinary way, these roasted ores have been treated with niter and soda and the resulting arsenate of soda washed out of the roasted ore, but notwithstanding that there has been a large commercial demand for arsenate of soda for many years no one has ever proposed to utilize the arsenate of soda produced in this way. It was treated entirely as a waste product and thrown away. In fact the amount of arsenate of soda that would thus be produced from a ton of arsenid ore after being roasted in the ordinary way for the maximum removal of arsenic would be insignificant, and it required my invention for the roasting of ores for the maximum production of arsenic acid to make the roasting of arsenid ores commercially available for the production of arsenate of soda. I therefore call the roasting of arsenid ores for the production of the maximum amount of arsenic acid an arsenate roast.

The chief requirement in the roasting of arsenids for the production of the maximum amount of arsenic acid is to keep the temperature of roasting sufficiently low. It is, of course, essential that there should be a liberal supply of air.

The ores for which the process is especially designed, although its application is not restricted to these ores, are of the following general composition:—arsenic 30-60%, cobalt 5-15%, nickel 3-10%, silver 500-5,000 oz. per ton, with varying amounts of gangue or rock matter. In carrying out the process on these ores for instance the ore is crushed, 40-60 mesh being convenient, and then roasted in one of the ordinary roasting furnaces provided with means for preventing the escape into the works of the poisonous $As_2O_3$, which is given off in the roasting. After roasting the ore may carry from 15-30% of arsenic in the form of arsenic acid ($As_2O_5$) combined with various metallic oxids in the roasted ore as metallic arsenates. A properly roasted ore will remain fairly pulverulent, but if lumps should be formed they may easily be reduced to powder. To the roasted ore in powder is added a sufficient amount of sodium hydrate, preferably in the form of a concentrated solution, say 1.10–1.25 specific gravity, to combine with the arsenic acid of the roasted ore and leave a slight excess and the mixture heated in a cast iron or other pot provided with means for stirring the charge. Of course the amount of sodium hydrate used varies with the amount of arsenic acid remaining in the roasted ore. The pot is then heated by a steam jacket or otherwise and the charge stirred until it becomes a thick pasty mass through the evaporation of the water and the chemical reactions taking place within the mass. By this treatment the arsenic acid is forced to leave the metallic oxids and combine with the soda, while the oxids are separated in various forms. When this treatment is finished the charge is allowed to cool off if necessary and then water is added to dissolve the soda arsenate and form a concentrated solution and the charge thoroughly stirred, heat being applied if necessary. The strong solution of soda arsenate is next separated from the insoluble residue by a suitable filter. By proper management the solution may be kept strong enough to deposit crystals of soda arsenate on cooling, but if not it may be evaporated to the crystallizing point and the soda arsenate recovered by the well known method of crystallization. Mother liquors may be evaporated for the recovery of further crops of crystals. In some cases, however, the arsenate of soda may be utilized in the original solution without separating it therefrom as such in the form of crystals. The insoluble residue remaining after filtering off the soda arsenate is suitably washed and may be utilized for the metals it contains. The residue may be treated immediately for the recovery of the silver by well known means, or it may be treated with acid, filtered off and washed and then treated by the usual means for the recovery of the silver. The solution obtained in the acid treatment of the residue may be treated in well known ways for the recovery of the cobalt and nickel in the ordinary commercial forms.

In the claims the words ores and ore are used to cover artificial compounds as well as the native minerals.

What I claim as new and valuable is:—

1. The process of treating arsenids which consists in oxidizing the arsenic for the formation of arsenic acid and combining this arsenic acid with an alkali to form soluble alkali arsenate, substantially as described.

2. The process of treating arsenids which consists in oxidizing the arsenic for the formation of arsenic acid, combining this arsenic acid with an alkali to form soluble alkali arsenate and separating the alkali arsenate from the residue, substantially as described.

3. The process of treating arsenids which consists in oxidizing the arsenic for the formation of arsenic acid and combining this arsenic acid with an alkali to form soluble alkali arsenate, separating the alkali arsenate from the residue and utilizing the metals remaining in the residue, substantially as described.

4. The process of treating arsenids which consists in oxidizing the arsenic for the formation of arsenic acid and combining this arsenic acid with soda to form soluble arsenate of soda, substantially as described.

5. The process of treating arsenids which consists in oxidizing the arsenic for the formation of arsenic acid, combining this arsenic acid with soda to form soluble arsenate of soda and separating the arsenate of soda from the residue, substantially as described.

6. The process of treating arsenids which consists in oxidizing the arsenic for the formation of arsenic acid and combining this arsenic acid with soda to form soluble arsenate of soda, separating the arsenate of soda from the residue and utilizing the metals remaining in the residue, substantially as described.

7. The process of treating arsenids which consists in oxidizing the arsenic for the formation of arsenic acid and combining this arsenic acid with soda, dissolving the arsenate of soda in water, filtering and recovering the arsenate of soda by crystallization, substantially as described.

8. The process of treating arsenid ores which consists in oxidizing the ores for the formation of metallic arsenates and converting the arsenic acid thereby formed into soluble alkali arsenate, substantially as described.

9. The process of treating arsenid ores which consists in roasting the ores for the formation of metallic arsenates and converting the arsenic acid thereby formed into soluble alkali arsenate, substantially as described.

10. The process of treating arsenid ores which consists in roasting the ores for the formation of metallic arsenates, converting the arsenic acid thereby formed into soluble alkali arsenate and separating this soluble arsenate from the balance of the ore, substantially as described, 11. The process of treating arsenid ore which consists in roasting the ore for the formation of metallic arsenates, treating the roasted ore with caustic soda, adding water and filtering, substantially as described.

12. The process of treating arsenid ore which consists in roasting the ore for the formation of metallic arsenates, treating the roasted ore with caustic soda, adding water, filtering and recovering the arsenate of soda from the solution, substantially as described.

13. The process of preparing alkali arsenate which consists in roasting arsenid ore for the production of metallic arsenates, decomposing the metallic arsenate thereby formed with the simultaneous formation of alkali arsenate, dissolving the alkali arsenate in water, filtering the solution from the balance of the ore, and recovering the alkali arsenate by crystallization, substantially as described.

14. The process of preparing and utilizing arsenate of soda which consists in roasting arsenid ore, converting arsenic acid thereby formed into arsenate of soda; filtering the solution and utilizing the arsenate of soda in the solution, substantially as described.

15. The process of treating arsenid ores which consists in oxidizing the ores for the formation of metallic arsenates, decomposing the arsenate thereby formed and converting the arsenic acid into water soluble alkali arsenate, substantially as described.

16. The process of treating arsenid ores which consists in roasting the ores for the formation of metallic arsenates, decomposing the arsenate thereby formed and converting the arsenic acid into water soluble alkali arsenate, substantially as described.

17. The process of preparing alkali arsenate which consists in oxidizing arsenid ore, converting the arsenic acid thereby formed into alkali arsenate, dissolving the alkali arsenate in water, filtering the solution and recovering the alkali arsenate by crystallization, substantially as described.

18. The process of treating arsenid ore which consists in roasting the ore, treating the roasted ore with caustic soda, adding water and filtering, substantially as described.

19. The process of treating arsenid ore which consists in roasting the ore, treating the roasted ore with caustic soda, adding water, filtering and recovering the arsenate of soda from the solution, substantially as described.

20. The process of treating arsenid ore which consists in roasting the ore, treating the roasted ore with caustic soda, adding water, filtering and recovering the valuable metals from the residue, substantially as described.

21. The process of treating arsenid ore which consists in roasting the ore, treating the roasted ore with caustic soda, adding water, filtering, recovering arsenate of soda from the solution, and recovering the valuable metals from the residue, substantially as described.

22. The process of treating arsenid ores of silver which consists in roasting the ores, treating the roasted ore with caustic alkali, adding water, filtering and recovering the silver from the residue, substantially as described.

23. The process of treating arsenid ores of silver and other metals which consists in roasting the ore, treating the roasted ore with caustic alkali, adding water, filtering, treating the residue with acid, filtering, recovering the metals from the solution and recovering the silver from the final residue, substantially as described.

In testimony whereof I affix my signature in presence of two witnesses.

FREDERIC P. DEWEY.

Witnesses:
WM. J. McCAUGHEY,
FREDERIC L. MOORE.